United States Patent
Arab et al.

(10) Patent No.: US 10,433,270 B1
(45) Date of Patent: Oct. 1, 2019

(54) SYNCHRONIZATION FOR BATTERY POWERED IOT NETWORKS

(71) Applicant: Verizon Patent and Licensing Inc., Arlington, VA (US)

(72) Inventors: Aliasghar Arab, Colonia, NJ (US); Nanjun Qian, Princeton, NJ (US); Nitinkumar H. Gupta, Princeton Junction, NJ (US); Jeremy Nacer, Denville, NJ (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 0 days.

(21) Appl. No.: 16/007,341

(22) Filed: Jun. 13, 2018

(51) Int. Cl.
| | | |
|---|---|---|
| *H04W 56/00* | (2009.01) | |
| *H04W 52/02* | (2009.01) | |
| *H04L 7/00* | (2006.01) | |
| *H04W 28/08* | (2009.01) | |
| *H04L 12/803* | (2013.01) | |
| *H04W 40/02* | (2009.01) | |

(Continued)

(52) U.S. Cl.
CPC ......... *H04W 56/001* (2013.01); *H04L 7/0012* (2013.01); *H04L 7/0025* (2013.01); *H04L 47/125* (2013.01); *H04W 28/08* (2013.01); *H04W 36/165* (2013.01); *H04W 40/02* (2013.01); *H04W 52/0209* (2013.01); *H04W 52/0212* (2013.01); *H04W 52/0219* (2013.01); *H04W 52/0222* (2013.01); *H04W 52/0274* (2013.01); *H04W 56/002* (2013.01); *H04W 56/0015* (2013.01); *H04W 4/80* (2018.02); *H04W 84/12* (2013.01)

(58) Field of Classification Search
CPC ........... H04W 56/001; H04W 56/0015; H04W 56/002; H04W 36/165; H04W 40/02; H04W 28/08; H04W 52/0274; H04W 52/0222; H04W 52/0219; H04W 52/0212; H04W 52/0209; H04W 4/80; H04W 84/12; H04L 7/0012; H04L 7/0025; H04L 47/125
See application file for complete search history.

(56) References Cited

U.S. PATENT DOCUMENTS

| 10,257,798 B1* | 4/2019 | Koelemeij | ........ H04W 56/0015 |
|---|---|---|---|
| 2010/0279745 A1* | 11/2010 | Westcott | ........... H04W 52/0274 |
| | | | 455/574 |

(Continued)

FOREIGN PATENT DOCUMENTS

WO WO-2018076375 A1 * 5/2018

*Primary Examiner* — Joshua Kading

(57) ABSTRACT

A device, configured as a coordinator for a wireless IoT network, may include a memory configured to store instructions and a processor configured to execute the instructions to identify Internet of Things (IoT) devices associated with the wireless IoT network; determine a clock error rate for the wireless IoT network; determine a last synchronization time; determine a data time period during which one or more of the IoT devices are expected to send data to the device; and set a wakeup time period for the device based on the determined clock error rate, last synchronization time, and data time period. The processor may be further configured to enter a sleep mode; exit the sleep mode when the wakeup time period begins; and perform a clock synchronization between the device and the plurality of IoT devices during the wakeup time period.

20 Claims, 8 Drawing Sheets

(51) Int. Cl.
*H04W 36/16* (2009.01)
*H04W 84/12* (2009.01)
*H04W 4/80* (2018.01)

(56) References Cited

U.S. PATENT DOCUMENTS

2014/0064166 A1* 3/2014 HomChaudhuri ............................ H04W 52/0216 370/311
2018/0343036 A1* 11/2018 Kim ...................... H04W 48/16
2019/0007902 A1* 1/2019 Khaled ............. H04W 56/0015

* cited by examiner

SYNCHRONIZATION FOR BATTERY POWERED IOT NETWORKS

BACKGROUND INFORMATION

Wireless communication service providers continue to improve and expand available services as well as networks used to deliver such services. One aspect of such improvements includes the development of wireless access networks as well as options to utilize such wireless access networks. Network providers may manage a large number of wireless access networks and a particular wireless access network may include a large number of network devices. In order to maintain a quality of service across a network, or across multiple networks, the provider may need to manage the network devices.

DETAILED DESCRIPTION OF PREFERRED EMBODIMENTS

Figure 1:
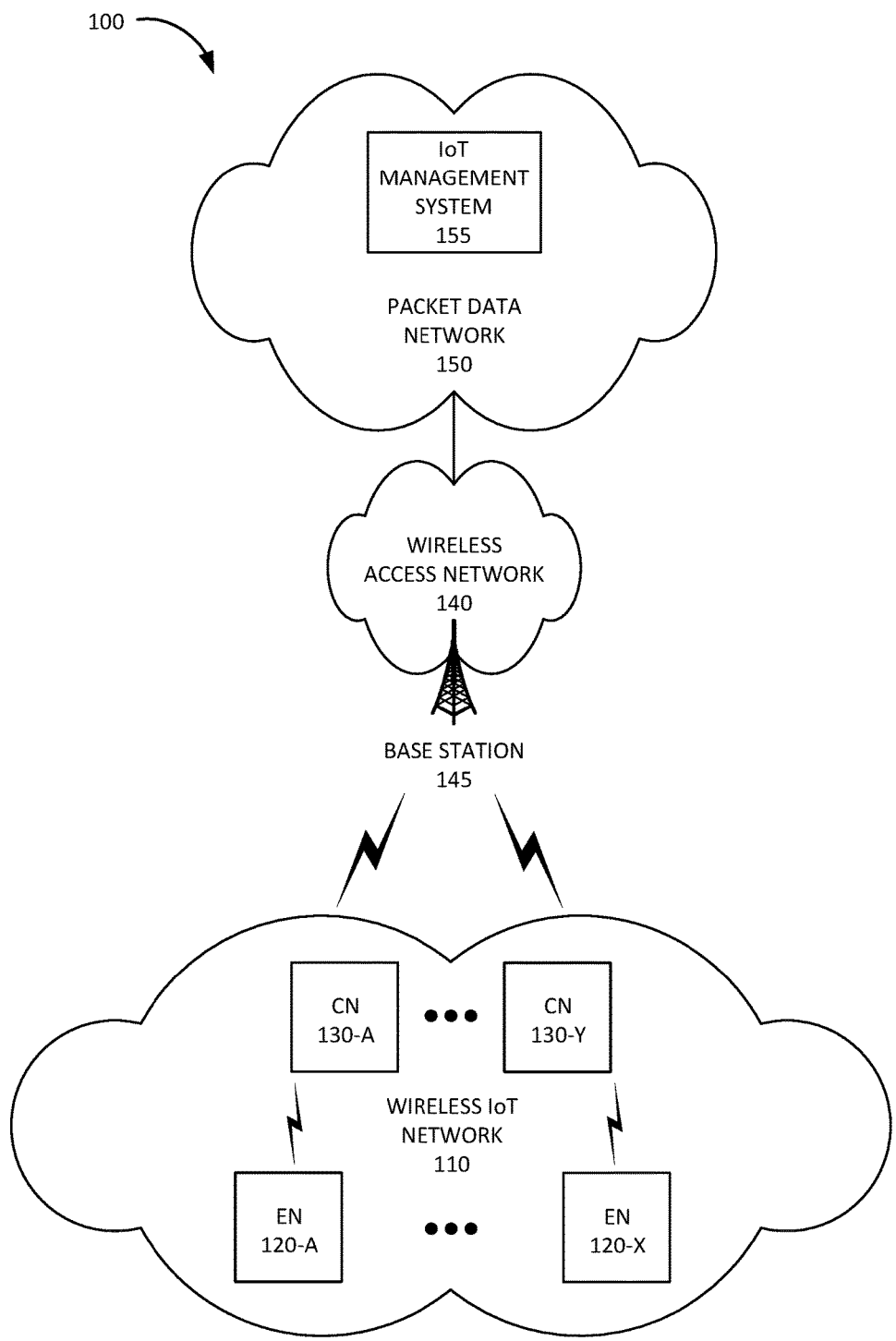
FIG. 1 is a diagram illustrating an environment according to an implementation described herein.

The following detailed description refers to the accompanying drawings. The same reference numbers in different drawings identify the same or similar elements.

An increasing number of Internet of Things (IoT) applications has led to an exponentially growing number of IoT devices employing machine-to-machine (M2M) communication, such as Machine-Type Communication (MTC). An IoT application may be implemented using a wireless IoT network. Examples of such IoT applications include applications for smart homes, smart parking meters and/or occupancy sensors, smart utility meters, a smart power grid, and/or other types of applications that may employ a wireless network of IoT devices. A wireless IoT network may include IoT devices with limited resources, such as battery power. For example, in a network of IoT sensor devices, it may be desirable to have particular IoT sensors with an embedded battery that lasts for several years.

A wireless IoT network may include a number of end node devices and one or more coordinator node devices. The end node devices and one or more coordinator node devices may communicate with each other using a short-range wireless technology (e.g., communication range less than 100 meters), such as, for example, Bluetooth, Bluetooth Low Energy, Zigbee, Sub-1 gigahertz (Sub-1 GHz), WiFi, Z-Wave, and/or another type of short-range wireless technology. The end node devices may collect data and/or perform other tasks and the coordinator node devices may coordinate the operation of the wireless IoT networks. For example, the end node devices may collect data and send the data at particular intervals to a coordinator node device. The coordinator node device may collect the data and may post the data to an IoT management system, such as a server device, at particular intervals using a long-range wireless connection (e.g., a cellular connection, such as Narrow Band IoT (NB-IoT), Category Machines (Cat-M1), etc.), and/or a wired connection. Furthermore, the coordinator node device may receive updates and/or instructions from the IoT management system and may send the updates and/or instructions to the end node devices. However, a coordinator node device may consume a significant amount of power and it may not be possible to power a coordinator node device with a battery. Requiring a coordinator node device to be connected to a wired source of power may significantly limit the design of wireless IoT networks.

Implementations described herein relate to synchronization for battery powered wireless IoT networks. An active coordinator node device may conserve battery power by being configured to enter a sleep mode and wake up at particular intervals to receive data from, and/or otherwise communicate with, end node devices in a wireless IoT network. The coordinator node device may determine a wakeup time interval by predicting when the end node devices will send data to the coordinator node device based on historical factors such as the frequency at which data was sent during particular times of day, days of week, times of year, holidays, weather events, calendar events, and/or other types of information.

Furthermore, the coordinator node may determine a clock error rate for the wireless IoT network based on, for example, the accuracy of clock crystals associated with the coordinator node device and the end node devices in the wireless IoT network. The coordinator node device may further determine the wakeup time intervals based on clock error rate to ensure that the differences in clock errors do not result in the wakeup time of the coordinator node device to become out of sync with the time period during which an end node is expected to send data to the coordinator node device. The coordinator node device may perform a synchronization with the end node devices, and/or other coordinator node devices, at particular intervals during a wakeup time period to correct for the clock error rates.

For example, a clock crystal, such as a crystal used in a Texas Instruments CC26xx chip, may have an error of about 500 parts per million (ppm), which may correspond to a total error of about 40.64 seconds per day, or about 20.32 minutes per month. Furthermore, the accuracy of a clock crystal may vary based on the manufacturing process, the operating temperature of the clock crystal, the age of the clock crystal (e.g., the error may change as the crystal ages), frequency pulling due to mismatched loading impedance, and/or other factors. However, if a coordinator node device needs to report data to an IoT management system once per day, the coordinator node device may need to be active less than two minutes per day if the coordinator node device is synchronized with the end node devices at least once per day. This may result in significantly prolonging the battery life time of a coordinator node device, while reducing deployment of maintenance personnel to change batteries.

For example, an IoT device with a 225 milliamp hour (mAh) coin-sized battery may consume less than 0.2 milliamperes (mA) on average per day if active under a minute and may thus achieve a 10 year life cycle. The average power consumption of the sensor node device may be defined as:

$$\frac{T_{tx}I_{tx} + T_{sens}I_{sens} + T_{sleep}I_{sleep}}{T_{tx} + T_{sens} + T_{sleep}} \leq \frac{\text{Battery size (mAh)}}{\text{Expected life }(hrs)}, \quad \text{Eq. (1)}$$

where $T_{tx}$ corresponds to transmission time, $I_{tx}$ corresponds to the transmission current, $T_{sens}$ corresponds to the sensor measurement time, $I_{sens}$ corresponds to the sensor measurement current, $T_{sleep}$ corresponds to the sleep mode time, and $I_{sleep}$ corresponds to the sleep mode current.

For an end node device, such as a sensor, $T_{sens}$ may be optimized to prolong battery life based on the application. For example, for a smart parking application, an occupancy sensor device, which uses a magnetic sensor to sense whether a parking spot is occupied in a garage, may be configured to have a short sensing period (which may drain battery life but reduce reporting latency) during rush hours and to have a long sensing period (which conserves battery life) during off-peak hours. Similarly, for a coordinator node device, $T_{sens}$ may refer to the length of time that the coordinator node device is in a wake mode, listening for messages from the end node devices. Thus, the sleep time periods for the end node devices and/or coordinator node devices may be determined dynamically based on the application to maximize battery life.

Thus, implementations described herein relate to an IoT device that includes a computer device configured as a coordinator node in a wireless IoT network. The IoT device may identify a group of IoT devices in a wireless IoT network, determine a clock error rate associated with the wireless IoT network; determine a last synchronization time period; determine a data time period during which one or more of the group of IoT devices are expected to send data to the IoT device; and set a wakeup time period for the IoT device based on the determined clock error rate, the determined last synchronization time period, and the determined data time period. The IoT device may then enter a sleep mode and exit the sleep mode when the wakeup time period begins. The IoT device may perform clock synchronization between the IoT device and the IoT devices during the wakeup time period. Synchronization of end node devices with coordinator node devices may conserve battery power and prolong the life of a wireless IoT network.

Determining the clock error rate associated with the wireless IoT network may include determining an error rate of a clock crystal associated with the coordinator node device, determining error rates of clock crystals associated with particular ones of the end node devices, and selecting a clock error rate based on a highest one of the determined error rates.

Performing the clock synchronization may include receiving data from one of the IoT devices during the wakeup time period and sending an acknowledgement packet to the IoT device with synchronization data included in the acknowledgement packet. Thus, as data is received from different IoT devices while the coordinator node is awake, the clocks of the different IoT devices may be synchronized with the clock of the coordinator node.

In some implementations, the data time period during which one or more of the group of IoT devices are expected to send data to the IoT device may be determined based on historical sending of data associated with each particular IoT device in the wireless IoT network. For example, the frequency at which data is sent by a particular IoT device may vary based on a time of day, a day of week, a time of year, a holiday, a calendar event, a weather event, and/or another type of particular time period. Furthermore, the data time period for a particular IoT device may be updated at particular intervals based on received data from the particular IoT device. Thus, the IoT device may determine a new data time period based on the received data and set a new wakeup time period based on the determined new data time period and the determined clock error rate.

In other implementations, the coordinator node device may select the data time period for a particular end node device and may instruct the particular end node device to send data to the coordinator node device during the selected data time period and to enter a sleep mode until the selected data time period. The data time period may be selected based on the determined clock error rate to ensure that the particular end node device and the coordinator node device are still synchronized when the data time period begins. Additionally or alternatively, the coordinator node device may instruct the end node devices to wait to send data to the coordinator node device until the coordinator node device exits the sleep mode.

The coordinator node device may be configured to forward the data received from the end node devices to an IoT management system (e.g., implemented via one or more server devices) via a long-range wireless connection, such as an NB-IoT connection, a Cat-M1 connection, and/or another type of cellular connection. Alternatively, the coordinator node device may forward the data to the IoT management system using a wired connection. Furthermore, the coordinator node device may perform load balancing with one or more other coordinator node devices in the wireless IoT network. For example, the coordinator node device may instructing the end node devices to send data to the other coordinator node device during a subsequent synchronization time period and instruct the other coordinator node device to exit a sleep mode and perform the clock synchronization during the subsequent synchronization time period.

FIG. 1 is a diagram of an exemplary environment 100 in which the systems and/or methods, described herein, may be implemented. As shown in FIG. 1, environment 100 may include a wireless IoT network 110, a wireless access network 140, and a packet data network 150.

Wireless IoT network 110 may include a set of IoT devices configured to communicate with each other using a short-range (e.g., less than 100 meters) wireless technology, such as, for example, Bluetooth, Bluetooth Low Energy (BLE), Zigbee, Sub-1 GHz (e.g., IEEE 802.15.4), WiFi, Z-Wave, Internet Protocol version 6 over Low Power Wireless Personal Area Network (6LoWPAN), and/or another type of short-range wireless technology. Wireless IoT network 110 may include end node (EN) devices 120-A to 120-X (referred to collectively as "EN devices 120" and individually as "EN device 120") and coordinator node (CN) devices 130-A to 130-Y (referred to collectively as "CN devices 130" and individually as "CN device 130").

EN device 120 may include an IoT device with short-range wireless communication functionality. EN device 120 may include a battery and be powered by the battery. EN device 120 may include a clock crystal and may perform operations at a particular frequency based on the clock crystal. EN device 120 may report data to an active CN device 130 at particular intervals. EN device 120 may receive synchronization data from the active CN device 130 and may synchronize a clock with the active CN device 130 based on the received synchronization data.

CN device 130 may include an IoT device with short-range wireless communication functionality. Furthermore, CN device 130 may include a modem with long-range wireless communication functionality to communicate with a base station 145 using, for example, NB-IoT, Cat-M1, and/or another type of IoT cellular technology, such as a Fifth Generation (5G) standard. CN device 130 may include a battery and be powered by the battery. CN device 130 may include a clock crystal and may perform operations at a particular frequency based on the clock crystal.

One of CN devices 130-A to 130-Y may be designated as an active CN device 130 during a particular time period. The active CN device 130 may receive and collect data from EN devices 120, as well as from other CN devices 130 and itself, and may post the collected data to an IoT management system 155 (shown in packet data network 150) via base station 145 using long-range wireless signals. The active CN device 130 may also receive updates and/or instructions from IoT management system 155 and may forward the received updates and/or instructions to EN device 120 and/or other CN devices 130.

The active CN device 130 may determine when EN devices 120 are expected to send data and at what frequency, may set wakeup time periods to wake up and receive the data, and may enter a sleep mode outside of the wakeup time periods. Furthermore, at particular intervals (e.g., once a day), during a wakeup time period, the active CN device 130 may send synchronization data to EN devices 120 to synchronize the clocks of the EN devices 120, and/or other CN devices 130, with the clock of the active CN device 130. For example, the active CN device 130 may send the synchronization data in an acknowledgement packet in response to receiving data from EN device 120 and/or CN device 130.

Moreover, the active CN device 130 may perform load balancing by instructing another CN device 130 to become the active CN device 130. For example, the active CN device 130 may signal EN devices 120, and/or other CN devices 130, to send data to the new active CN device 130 and may instruct the new active CN device 130 to become the new active CN device 130.

EN device 120 and/or CN device 130 may each include an electronic device with a microcontroller unit (MCU), such as a microcontroller controlling one or more actuators, a microcontroller controlling one or more sensors, a microcontroller that performs data processing, and/or another type of electronic device with a microcontroller. Examples of such devices may include a parking or road sensor (e.g., a magnetic vehicle detector, a motion sensor, a force or load sensor, a vibration sensor, etc.), a utility meter or monitor (e.g., an electricity sensor, a water sensor, a gas sensor, etc.), a weather sensor (e.g., a temperature sensor, a humidity sensor, a barometric pressure sensor, a wind sensor, a light sensor, etc.), a smart city sensor (e.g., a building vibration sensor, a noise level sensor, an electromagnetic field sensor, a traffic congestion level sensor, a traffic light sensor, a lighting level sensor, a waste container fill level sensor, an air pollution level sensor, etc.), a device associated with a security system (e.g., a camera, a motion sensor, a door sensor, a window sensor, etc.), and/or another type of battery-powered device in a wireless IoT network.

Wireless access network 140 may provide access to packet data network 150 for wireless devices, such as CN device 130. Wireless access network 140 may establish or may be incorporated into a packet data network connection between CN device 130 and packet data network 150 via one or more Access Point Names (APNs). For example, wireless access network 140 may establish an Internet Protocol (IP) connection between CN device 130 and packet data network 150. Furthermore, wireless access network 140 may enable CN device 130 to communicate with an application server, and/or another type of device, located in packet data network 150 using a non-IP communication method, such as, for example, Data over Non-Access Stratum (DoNAS).

In some implementations, wireless access network 140 may include a Long Term Evolution (LTE) access network (e.g., an evolved packet core (EPC) network). In other implementations, wireless access network 140 may include a Code Division Multiple Access (CDMA) access network. For example, the CDMA access network may include a CDMA enhanced High Rate Packet Data (eHRPD) network (which may provide access to an LTE access network).

Furthermore, wireless access network 140 may include an LTE Advanced (LTE-A) access network and/or a Fifth Generation (5G) access network or other advanced network that includes functionality such as carrier aggregation; advanced or massive multiple-input and multiple-output (MIMO) configurations (e.g., an 8×8 antenna configuration, a 16×16 antenna configuration, a 256×256 antenna configuration, etc.); cooperative MIMO (CO-MIMO); relay stations; Heterogeneous Networks (HetNets) of overlapping small cells and macrocells; Self-Organizing Network (SON) functionality; MTC functionality, such as 1.4 MHz wide enhanced MTC (eMTC) channels (also referred to as Cat-M1), Low Power Wide Area (LPWA) technology such as Narrow Band (NB) IoT (NB-IoT) technology, and/or other types of MTC technology; and/or other types of LTE-A and/or 5G functionality. Wireless access network 120 may include base station 145. Base station 145 may include and/or be associated with one or more cells that include devices and/or components configured to enable wireless communication with CN device 130. For example, each cell may include and/or be associated with a radio frequency (RF) transceiver facing a particular direction.

Packet data network 150 may include a local area network (LAN), a wide area network (WAN), a metropolitan area network (MAN), an optical network, a cable television network, a satellite network, a wireless network (e.g., a CDMA network, a general packet radio service (GPRS) network, and/or an LTE network), an ad hoc network, a telephone network (e.g., the Public Switched Telephone Network (PSTN) or a cellular network), an intranet, or a combination of networks. Some or all of packet data network 150 may be managed by a provider of communication services that also manages wireless access network 140. Packet data network 150 may allow the delivery of Internet Protocol (IP) services to CN device 130, and may interface with other external networks. Packet data network 150 may include one or more server devices and/or network devices, or other types of computation or communication devices. In some implementations, packet data network 150 may include an IP Multimedia Sub-system (IMS) network (not shown in FIG. 1). An IMS network may include a network for delivering IP multimedia services and may provide media flows between UE device 110 and external IP networks or external circuit-switched networks (not shown in FIG. 1). Packet data network 150 may include IoT management system 155.

IoT management system 155 may include one or more devices, such as computer devices and/or server devices, which receive uplink data from CN device 130 and/or which send downlink data to CN device 130. For example, IoT management system 155 may be configured to collect sensor data from CN device 130, to receive reports from CN device 130, such as error reports and/or health status reports, to receive billing information from CN device 130, to receive location information from CN device 130, to receive requests for instructions from CN device 130, to receive requests for updates from CN device 130, and/or to receive other types of information from CN device 130. Additionally or alternatively, IoT management system 155 may be configured to send control instructions to an actuator associated with wireless IoT network 110, to send updates to wireless IoT network 110, to send instructions to perform particular actions by wireless IoT network 110, to send authentication information to wireless IoT network 110, to send a query for a particular type of information associated with wireless IoT network 110, and/or to send other types of data and/or instructions to wireless IoT network 110.

Although FIG. 1 shows exemplary components of environment 100, in other implementations, environment 100 may include fewer components, different components, differently arranged components, or additional functional components than depicted in FIG. 1. Additionally or alternatively, one or more components of environment 100 may perform functions described as being performed by one or more other components of environment 100.

Figure 2:
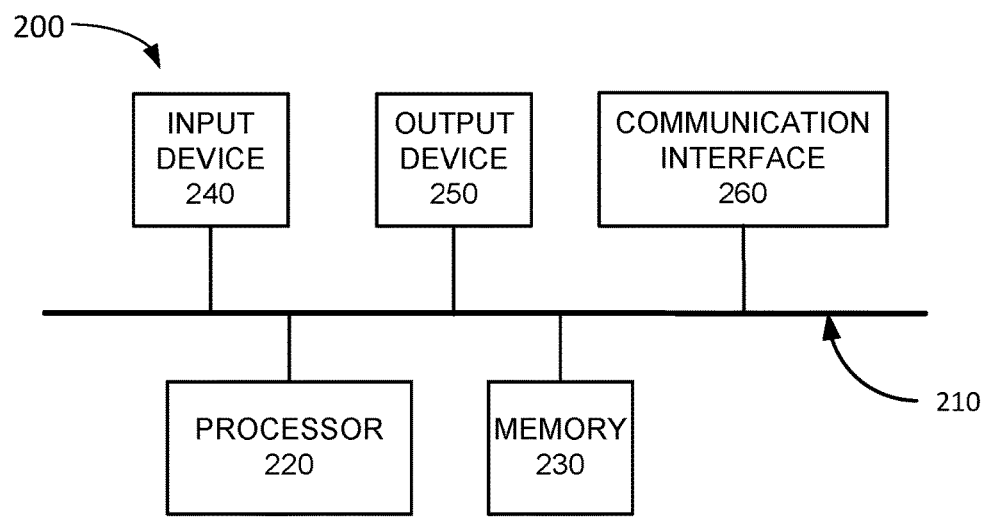
FIG. 2 is a diagram illustrating exemplary components of a device that may be included in the environment of FIG. 1.

FIG. 2 is a diagram illustrating example components of a device 200 according to an implementation described herein. EN device 120, CN device 130, base station 145, and/or IoT management system 155 may each include one or more devices 200. As shown in FIG. 2, device 200 may include a bus 210, a processor 220, a memory 230, an input device 240, an output device 250, and a communication interface 260.

Bus 210 may include a path that permits communication among the components of device 200. Processor 220 may include any type of single-core processor, multi-core processor, microprocessor, latch-based processor, and/or processing logic (or families of processors, microprocessors, and/or processing logics) that interprets and executes instructions. In other embodiments, processor 220 may include an application-specific integrated circuit (ASIC), a field-programmable gate array (FPGA), and/or another type of integrated circuit or processing logic.

Memory 230 may include any type of dynamic storage device that may store information and/or instructions, for execution by processor 220, and/or any type of non-volatile storage device that may store information for use by processor 220. For example, memory 230 may include a random access memory (RAM) or another type of dynamic storage device, a read-only memory (ROM) device or another type of static storage device, a content addressable memory (CAM), a magnetic and/or optical recording memory device and its corresponding drive (e.g., a hard disk drive, optical drive, etc.), and/or a removable form of memory, such as a flash memory.

Input device 240 may allow an operator to input information into device 200. Input device 240 may include, for example, a keyboard, a mouse, a pen, a microphone, a remote control, an audio capture device, an image and/or video capture device, a touch-screen display, and/or another type of input device. In some embodiments, device 200 may be managed remotely and may not include input device 240. In other words, device 200 may be "headless" and may not include a keyboard, for example.

Output device 250 may output information to an operator of device 200. Output device 250 may include a display, a printer, a speaker, and/or another type of output device. For example, device 200 may include a display, which may include a liquid-crystal display (LCD) for displaying content to the customer. In some embodiments, device 200 may be managed remotely and may not include output device 250. In other words, device 200 may be "headless" and may not include a display, for example.

Communication interface 260 may include a transceiver that enables device 200 to communicate with other devices and/or systems via wireless communications (e.g., radio frequency, infrared, and/or visual optics, etc.), wired communications (e.g., conductive wire, twisted pair cable, coaxial cable, transmission line, fiber optic cable, and/or waveguide, etc.), or a combination of wireless and wired communications. Communication interface 260 may include a transmitter that converts baseband signals to radio frequency (RF) signals and/or a receiver that converts RF signals to baseband signals. Communication interface 260 may be coupled to an antenna for transmitting and receiving RF signals.

Communication interface 260 may include a logical component that includes input and/or output ports, input and/or output systems, and/or other input and output components that facilitate the transmission of data to other devices. For example, communication interface 260 may include a network interface card (e.g., Ethernet card) for wired communications and/or a wireless network interface (e.g., a WiFi) card for wireless communications. Communication interface 260 may also include a universal serial bus (USB) port for communications over a cable, a Bluetooth™ wireless interface, a radio-frequency identification (RFID) interface, a near-field communications (NFC) wireless interface, and/or any other type of interface that converts data from one form to another form.

As will be described in detail below, device 200 may perform certain operations relating to the power management and synchronization in an wireless IoT network. Device 200 may perform these operations in response to processor 220 executing software instructions contained in a computer-readable medium, such as memory 230. A computer-readable medium may be defined as a non-transitory memory device. A memory device may be implemented within a single physical memory device or spread across multiple physical memory devices. The software instructions may be read into memory 230 from another computer-readable medium or from another device. The software instructions contained in memory 230 may cause processor 220 to perform processes described herein. Alternatively, hardwired circuitry may be used in place of, or in combination with, software instructions to implement processes described herein. Thus, implementations described herein are not limited to any specific combination of hardware circuitry and software.

Although FIG. 2 shows exemplary components of device 200, in other implementations, device 200 may include fewer components, different components, additional components, or differently arranged components than depicted in FIG. 2. Additionally or alternatively, one or more components of device 200 may perform one or more tasks described as being performed by one or more other components of device 200.

Figure 3:
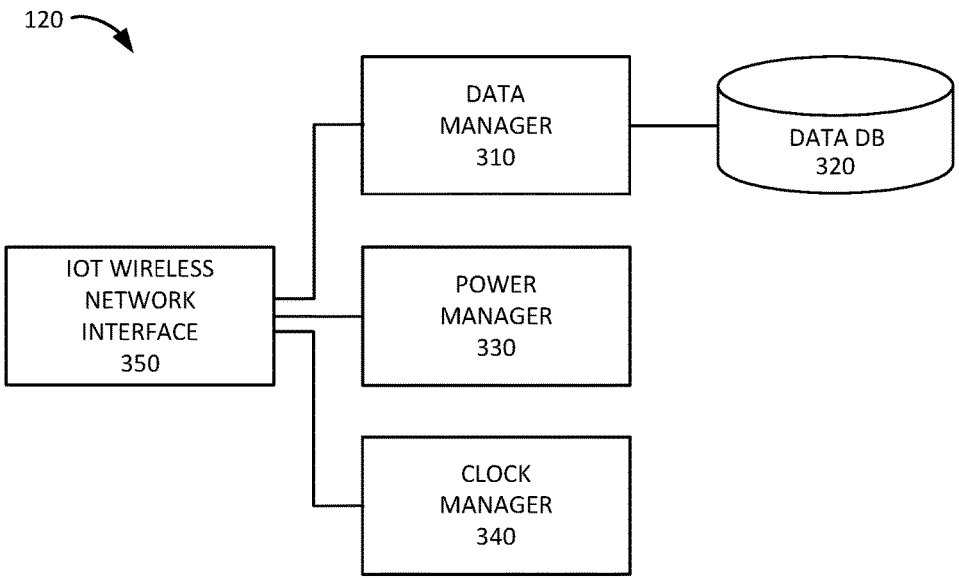
FIG. 3 is a diagram illustrating exemplary components of an end node device of FIG. 1.

FIG. 3 is a diagram illustrating exemplary components of EN device 120. The functional components of EN device 120 may be implemented, for example, via processor 220 executing instructions from memory 230. Alternatively, some or all of the functional components included in EN device 120 may be implemented via hard-wired circuitry. As shown in FIG. 3, EN device 120 may include a data manager 310, a data database (DB) 320, a power manager 330, a clock manager 340, and an IoT wireless network interface 350.

Data manager 310 may manage collection of data by EN device 120 and store the collected data in data DB 320. For example, data manager 310 may collect data from one or more sensors included or connected to EN device 120 at particular intervals and/or in response to a detected signal from a particular sensor. In some implementations, data manager 310 may receive instructions from CN device 130 to collect data during a particular time period and/or to send data to CN device 130 during the particular time period.

Power manager 330 may manage the power usage of EN device 120. For example, power manager 330 may monitor a battery level for a battery (not shown in FIG. 3) powering EN device 120 and may generate an alert if the battery level falls below a particular battery level threshold. Furthermore, power manager 330 may select a power consumption conserving mode during particular time periods. For example, power manager 330 may select to enter a sleep mode when EN device 120 is not collecting data or communicating with CN device 130. In some implementations, power manager 330 may receive instructions from CN device 130 to enter a sleep mode during particular time periods.

Clock manager 340 may manage a clock associated with EN device 120. The clock may be driven by a crystal associated with a particular error rate. Thus, the clock of EN device 120 may operate at a slower or faster rate with respect to the clock of CN device 130, resulting in the device times of EN device 120 and CN device 130 diverging over time. Clock manager 340 may adjust the clock time of EN device 120 at particular intervals based on synchronization data received from CN device 130. For example, clock manager 340 may adjust the clock time of EN device 120 to be synchronized with the clock of CN device 130.

IoT wireless network interface 350 may be configured to communicate with other devices in wireless IoT network 110, such as other EN devices 120 and/or CN devices 130, via a short-range wireless technology.

Although FIG. 3 shows exemplary components of EN device 120, in other implementations, EN device 120 may include fewer components, different components, additional components, or differently arranged components than depicted in FIG. 3. Additionally or alternatively, one or more components of EN device 120 may perform one or more tasks described as being performed by one or more other components of EN device 120.

Figure 4:
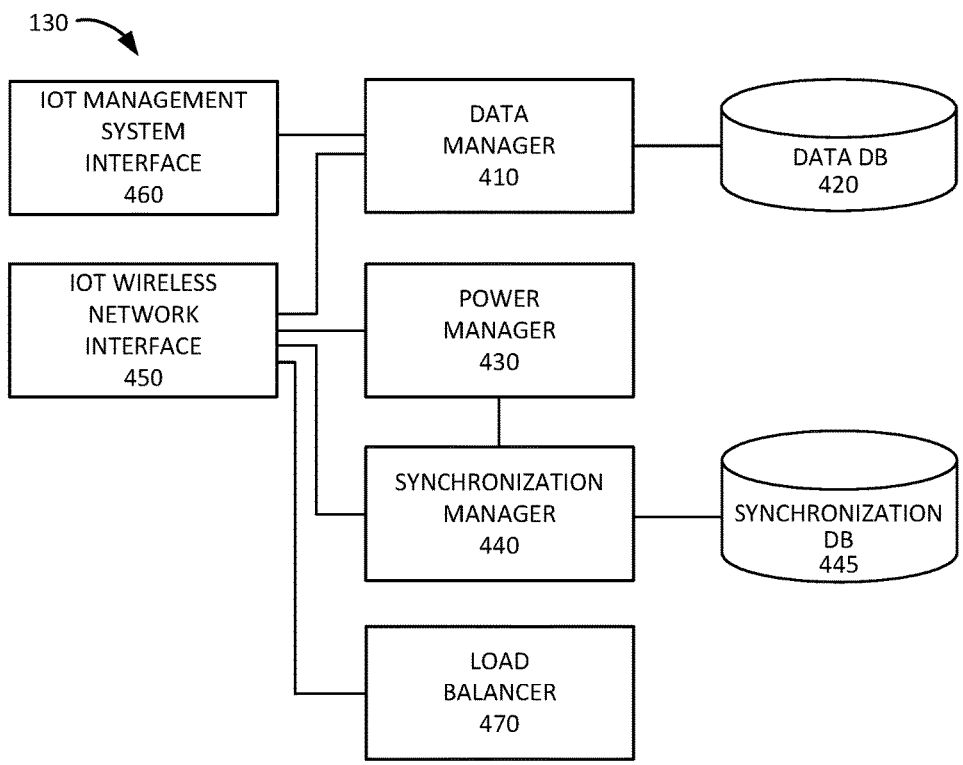
FIG. 4 is a diagram illustrating exemplary components of a coordinator node device of FIG. 1.

FIG. 4 is a diagram illustrating exemplary components of CN device 130. The functional components of CN device 130 may be implemented, for example, via processor 220 executing instructions from memory 230. Alternatively, some or all of the functional components included in CN device 130 may be implemented via hard-wired circuitry. As shown in FIG. 4, CN device 130 may include a data manager 410, a data DB 420, a power manager 430, a synchronization manager 440, a synchronization DB 445, an IoT wireless network interface 450, an IoT management system interface 460, and a load balancer 470.

Data manager 410 may manage collection of data by CN device 130 and store the collected data in data DB 420. For example, data manager 410 may collect data from EN devices 120 and/or one or more sensors included or connected to CN device 130 at particular intervals and/or in response to a detected signal from a particular sensor. In some implementations, data manager 410 may receive instructions from an active CN device 130 to collect data during a particular time period and/or to send data to the active CN device 130 during the particular time period.

Power manager 430 may manage the power usage of CN device 130. For example, power manager 430 may monitor a battery level for a battery (not shown in FIG. 4) powering CN device 130 and may generate an alert if the battery level falls below a particular battery level threshold. Furthermore, power manager 430 may select a power consumption conserving mode during particular time periods. For example, power manager 430 may select to enter a sleep mode when CN device 130 is not collecting data or communicating with an active CN device 130. In some implementations, power manager 430 may receive instructions from the active CN device 130 to enter a sleep mode during particular time periods.

Synchronization manager 440 may manage a clock associated with CN device 130. The clock may be driven by a crystal associated with a particular error rate. Thus, the clock of CN device 130 may operate at a slower or faster rate with respect to the clock of an active CN device 130, resulting in the device times of CN device 130 and the active CN device 130 diverging over time. Synchronization manager 440 may adjust the clock time of CN device 130 at particular intervals based on synchronization data received from the active CN device 130. For example, synchronization manager 440 may adjust the clock time of CN device 130 to be synchronized with the clock of the active CN device 130.

Furthermore, if CN device 130 corresponds to the active CN device 130 of wireless IoT network 110, synchronization manager 440 may perform a synchronization process for wireless IoT network 110 using information stored in synchronization DB 445. Exemplary information that may be stored in synchronization DB 445 is described below with reference to FIG. 5. Synchronization manager 440 may determine when other devices in wireless IoT network 110 are expected to send data to the active CN device 130, may determine clock error rates for the other devices in wireless IoT network 110, and may determine wakeup time periods for the active CN device 130 during which the active CN device 130 may receive data from the other devices in wireless IoT network 110. Furthermore, synchronization manager 440 may select a synchronization process to be performed during particular ones of the wakeup time periods (e.g., once per day, once every n-th wakeup time period, etc.) and may send synchronization data to the other devices in wireless IoT network 110 during the synchronization process.

IoT wireless network interface 450 may be configured to communicate with other devices in wireless IoT network 110, such as other EN devices 120 and/or CN devices 130, via a short-range wireless technology. IoT management system interface 460 may be configured to communicate with base station 145 via a long-range wireless technology, such as NB-IoT, Cat-M1, and/or another type of cellular wireless technology.

Load balancer 470 may perform load balancing with respect to CN devices 130 in wireless IoT network 110. For example, load balancer 470 may determine when to switch the active CN device 130 in wireless IoT network 110 to another CN device 130. Load balancing may be performed with respect to time (e.g., the time periods during which each CN device 130 acts as the active CN device 130 may be equally distributed over a particular time period), with respect to power consumption, and/or with respect to other factors. Load balancer 470 may determine that another CN device 130 should become the active CN device 130 and may instruct the other CN device 130 to become the active CN device 130 and/or may instruct other devices in wireless IoT network 110 to send data to the other CN device 130.

Although FIG. 4 shows exemplary components of coordinator node device 130, in other implementations, coordinator node device 130 may include fewer components, different components, additional components, or differently arranged components than depicted in FIG. 4. Additionally or alternatively, one or more components of coordinator node device 130 may perform one or more tasks described as being performed by one or more other components of coordinator node device 130.

Figure 5:
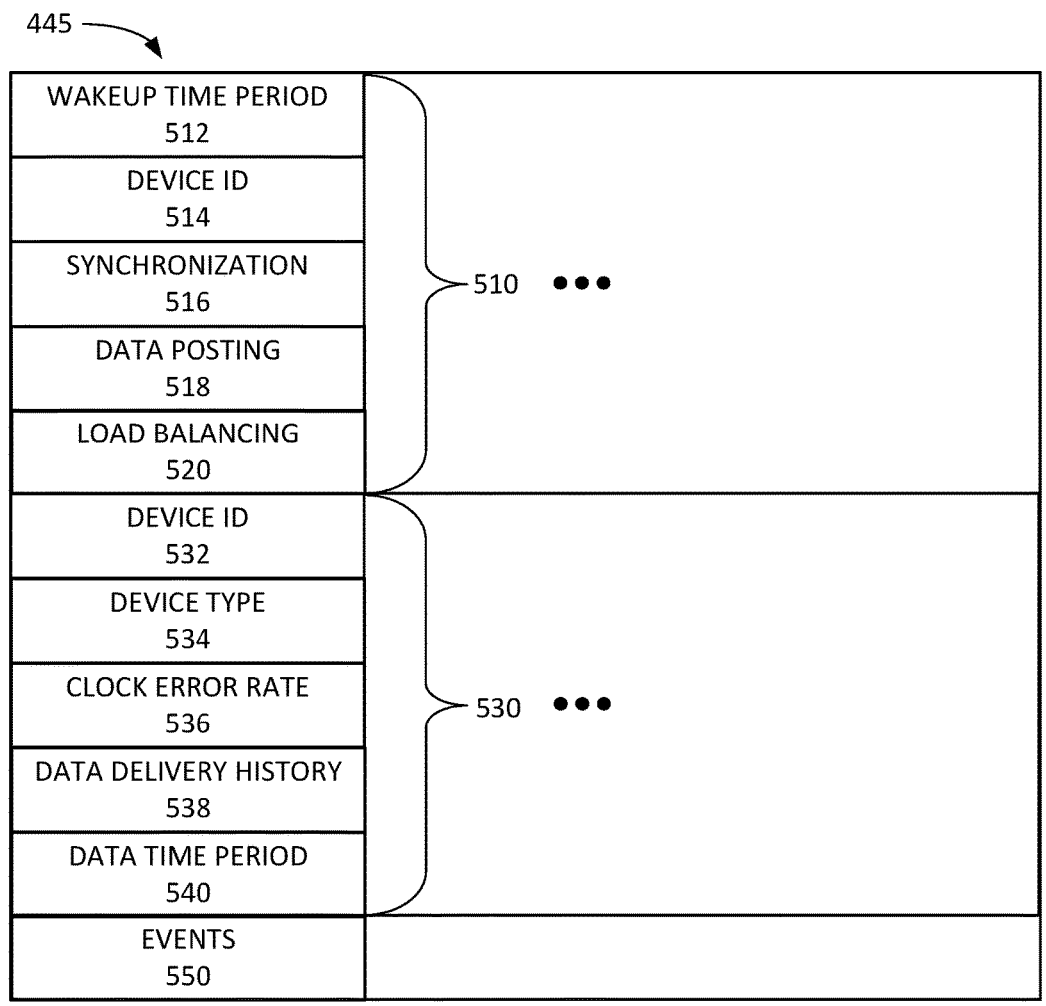
FIG. 5 is a diagram illustrating exemplary components of the synchronization database of FIG. 4.

FIG. 5 is a diagram illustrating exemplary components of synchronization DB 445. In some implementations, synchronization DB 445 may be stored as a distributed data set among CN devices 130-A to 130-Y. In other implementations, particular CN devices 130 may maintain their own versions of synchronization DB 445. In yet other implementations, IoT management system 155 may maintain a master version of synchronization DB 445 and may provide updates to synchronization DBs 445 stored in particular CN devices 130.

As shown in FIG. 5, synchronization DB 445 may include one or more wakeup time period records 510, one or more device records 530, and an events record 550. Each wakeup time period record 510 may store information associated with a particular scheduled wakeup time period. Wakeup time period record 510 may include a wakeup time period field 512, a device identifier (ID) field 514, a synchronization field 516, a data posting field 518, and a load balancing field 520.

Wakeup time period field 512 may store information identifying the particular scheduled wakeup time period. Device ID field 514 may store information identifying one or more devices in wireless IoT network 110 that are expected to send data during the particular scheduled wakeup time period. Synchronization field 516 may store information identifying whether synchronization information is to be sent to devices during the particular scheduled wakeup time period. Data posting field 518 may store information identifying whether collected data is to be posted to IoT management system 155 during the particular scheduled wakeup time period. Load balancing field 520 may store information identifying whether load balancing is to be performed during the particular scheduled wakeup time period to select another CN device 130 as the active CN device 130.

Each device record 530 may store information relating to a particular device in wireless IoT network 110. Device record 530 may include a device ID field 532, a device type field 534, a clock error rate field 536, a data delivery history field 538, and a data time period field 540. Device ID field 532 may include an ID that uniquely identifies a particular EN device 120 or a particular CN device 130 in wireless IoT network 110. For example, device ID field 532 may include a Media Access Control (MAC) address, a short-range wireless network ID (e.g., a Bluetooth ID, a ZigBee ID, a WiFi ID, etc.), an Internet Protocol (IP) address, a Session Initiation Protocol (SIP) address, a Mobile Station International Subscriber Directory Number (MSISDN), an International Mobile Subscriber Identity (IMSI) number, a Mobile Directory Number (MDN); and/or by another type of device ID associated with the particular device.

Device type field 534 may store information identifying a device type associated with the particular device. For example, device type field 534 may identify whether the particular device corresponds to EN device 120 or CN device 130, may identify a particular sensor type associated with the particular device, and/or may store other types of device type information. Clock error rate field 536 may store information identifying a clock error rate associated with the particular device. The clock error rate may be determined based on timestamps in messages received from the particular device, based on querying the particular device, based on obtaining information relating to the type of crystal included in the particular device, and/or using another technique.

Data delivery history field 538 may store information identifying time periods during which the particular device sent data to the active CN device 130 and/or information identifying how frequently data was sent by the particular device during a particular time period. Data time period field 540 may store information identifying a data time period during which the particular device is expected to send data to the active CN device 130 and/or may store information identifying how frequently the particular device is expected to send data to the active CN device 130 during the data time period. Data time period 540 may be determined based on information stored in data delivery history field 538.

Events field 550 may store information relating to one or more occurring or upcoming events associated with wireless IoT network 110. For example, events field 550 may store information identifying a holiday, a traffic event (e.g., a car accident, a traffic jam, road construction, etc.), a weather event (e.g., a storm, etc.), a venue event (e.g., a music event, a sports event, etc.), and/or another type of event. The event information may be obtained, for example, from a particular web site, application, and/or service associated with particular types of events. The event information may be used to estimate when and/or how frequently particular devices in wireless IoT network 110 will report data to an active CN device 130.

As an example, if wireless IoT network 110 includes parking occupancy sensors in a garage, a snowstorm may indicate that fewer cars may park in the garage, resulting in fewer changes in the occupancy state and thus fewer data packets being sent by EN devices 120 and/or CN devices 130 to the active CN device 130. As a result, the active CN device 130 may need to wake up less frequently during the snowstorm. As another example, a sports game event may indicate frequent changes in the occupancy state and more data being sent to the active CN device 130 and, as a result, the active CN device 130 may need to wake up more frequently to receive data.

Although FIG. 5 shows exemplary components of synchronization DB 445, in other implementations, synchronization DB 445 may include fewer components, different components, additional components, or differently arranged components than depicted in FIG. 5.

Figure 6:
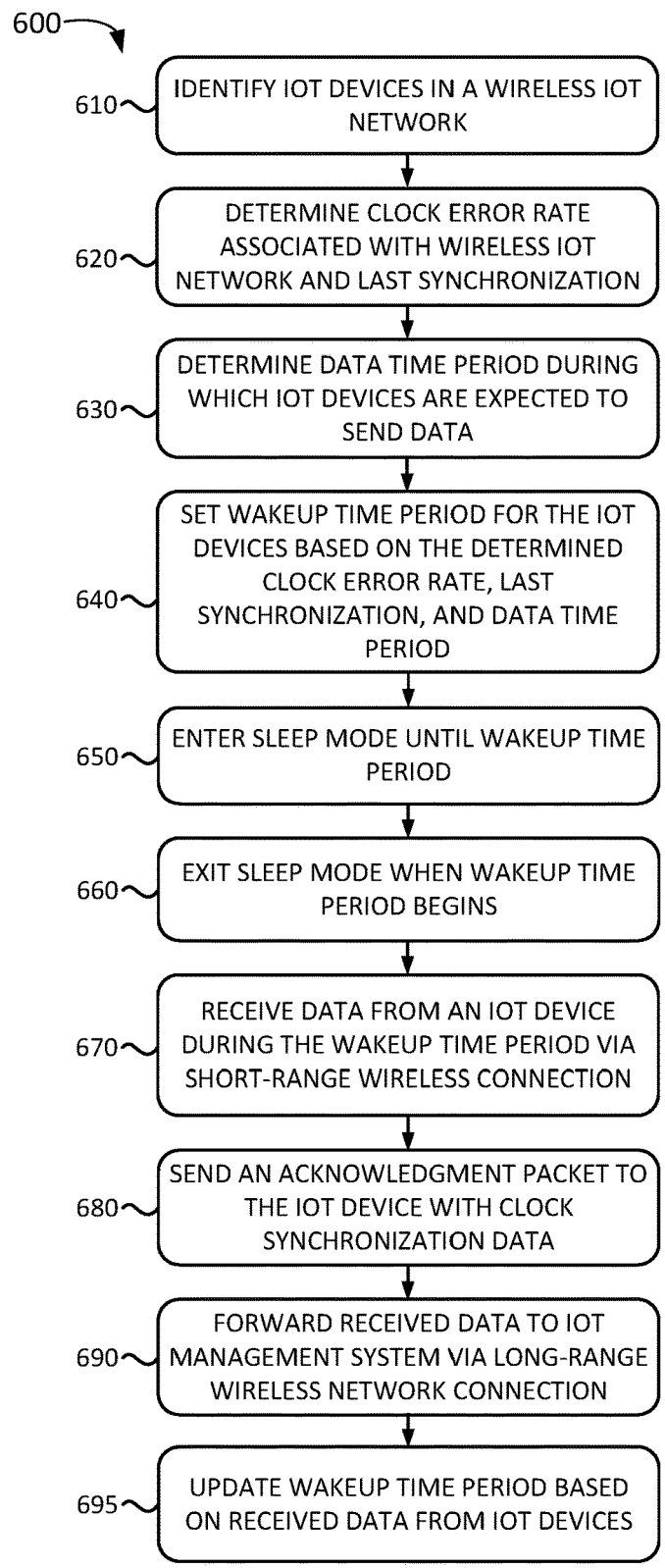
FIG. 6 is a flowchart of a process for synchronizing a wireless Internet of Things network according to an implementation described herein.

FIG. 6 is a flowchart 600 of a process for synchronizing a wireless IoT network according to an implementation described herein. In some implementations, the process of FIG. 6 may be performed by CN device 130. In other implementations, some or all of the process of FIG. 6 may be performed by another device or a group of devices separate from CN device 130.

The process of flowchart 600 may include identifying IoT devices in wireless IoT network 110 (block 610). For example, the active CN device 130 registers each EN device 120 and/or CN device 130 in wireless IoT network 110 when wireless IoT network 110 is first activated. The active CN device 130 may generate a device record 530 in synchronization DB 445 for each EN device 120 and/or CN device 130 in wireless IoT network 110.

A clock error rate associated with wireless IoT network 110 and a last synchronization may be determined (block 620), a data time period during which the IoT devices are expected to send data may be determined (block 630), and a wakeup time period for the IoT devices based on the determined clock error rate, the last synchronization, and the data time period may be set (block 640). For example, the active CN device 130 may determine error rates for the clock crystals of EN devices 120 and CN devices 130 in wireless IoT network 110 and may select the clock error rate for wireless IoT network 110 based on the highest error rate for any of the EN devices 120 and CN devices 130. Selecting the highest error rate may ensure that wakeup time periods for the active CN device 130 are selected to be of a sufficient length to overlap data time periods during which EN devices 120 and/or CN devices 130 are expected to send data based on any discrepancies in the clock time of the devices in wireless IoT network 110 since a last synchronization was performed. Furthermore, selecting the highest error rate may ensure that the clock error rate for wireless IoT network 110 may be used to determine how often a synchronization process should be performed.

Data time periods for EN devices 120 and/or CN devices 130 may initially be set by an operator configuring or setting up wireless IoT network 110, may be set based on default settings for sending data in EN devices 120 and/or CN devices 130, may be set based on the active CN device 130 instructing EN devices 120 and/or CN devices 130 when and/or how frequently to send data, and/or may be initially set using another technique. As an example, EN devices 120 and/or CN devices 130 may be initially configured to send data at regular intervals (e.g., once per hour, once every 10 minutes, etc.). As another example, EN devices 120 and/or CN devices 130 may be initially configured to send data each time new data is available.

The active CN device 130 may set wakeup time periods based on the determined data time periods during which EN devices 120 and/or CN devices 130 are expected to send data and may set the length of the wakeup time periods based on the determined clock rate to make sure the wakeup time period overlaps with the determined data time periods. Furthermore, the active CN device 130 may determine during which of the set wakeup time periods to perform a synchronization process. For example, a synchronization process may be performed at the end of a particular time period (e.g., once a day, etc.), every n-th wakeup time period, etc. from the time of the last synchronization process.

The active CN device 130 may enter a sleep mode (block 650) and may exit the sleep mode when the wakeup time period begins (block 660). For example, the active CN device 130 may enter a sleep mode, a standby mode, and/or another type of power saving mode until a wakeup time period begins. When the wakeup time period begins, the active CN device 130 may exit the power saving mode. Data may be received from an IoT device during the wakeup time period via a short-range wireless connection (block 670) and an acknowledgement packet may be sent to the IoT device with clock synchronization data (block 680). For example, after receiving data from EN device 120, the active CN device 130 may send an acknowledgement packet back to EN device 120, informing EN device 120 that the data was received and that EN device 120 may stop advertising or transmitting the data. The acknowledgement message may include clock synchronization data, such as an instruction to synchronize the clock of EN device 120 with the clock of the active CN device 130.

The received data may be forwarded to IoT management system 155 via a long-range wireless network connection (block 690). For example, the active CN device 130 may be configured to post data to IoT management system 155 at the end of a particular time period (e.g., once a day, etc.), every n-th wakeup time period, etc. The active CN device 130 may post the data to IoT management system 155 via base station 145 using NB-IoT, Cat-M1, and/or another type of a long-range wireless connection. The active CN device 130 may adjust how often it posts data to IoT management system 155 based on the particular application, such as the latency requirements for particular applications. For example, a parking sensor application may post data less frequently (e.g., every 30 minutes, etc.) than a security sensor application, which may most data much more frequently (e.g., every few seconds, etc.). Furthermore, the frequency at which the data is posted to IoT management system 155 may be different for different time periods. For example, for a smart parking application that measures parking occupancy, the data may be posted to IoT management system 155 more frequently during morning and/or evening rush hour time periods.

A wakeup time period may be updated based on the data received from the IoT device(s) (block 695). If EN device 120 and/or CN device 130 send data to the active CN device 130 and the active CN device 130 is in a sleep mode, the EN device 120 and/or CN device 130 may need to keep advertising and/or re-sending the data until the active CN device 130 wakes up. Thus, over time, the active CN device 130 may seek to improve the accuracy of the wakeup time periods by learning and/or storing patterns associated with the advertised availability of new data in EN devices 120 and/or CN devices 130. The set wakeup time periods may be updated at particular time periods based on the data received from EN devices 120 and/or CN devices 130. For example, if data is received less frequently during a particular time of day, day of week, and/or time of year, the frequency of the wakeup periods during that particular time of day, day of week, and/or time of year may be decreased. If data is received more frequently during a particular time of day, day of week, and/or time of year, the frequency of the wakeup periods during that particular time of day, day of week, and/or time of year may be increased. In this manner, the active CN device 130 may learn behavior patterns of EN devices 120 and adjust the wakeup time periods to efficiently receive data.

Figure 7:
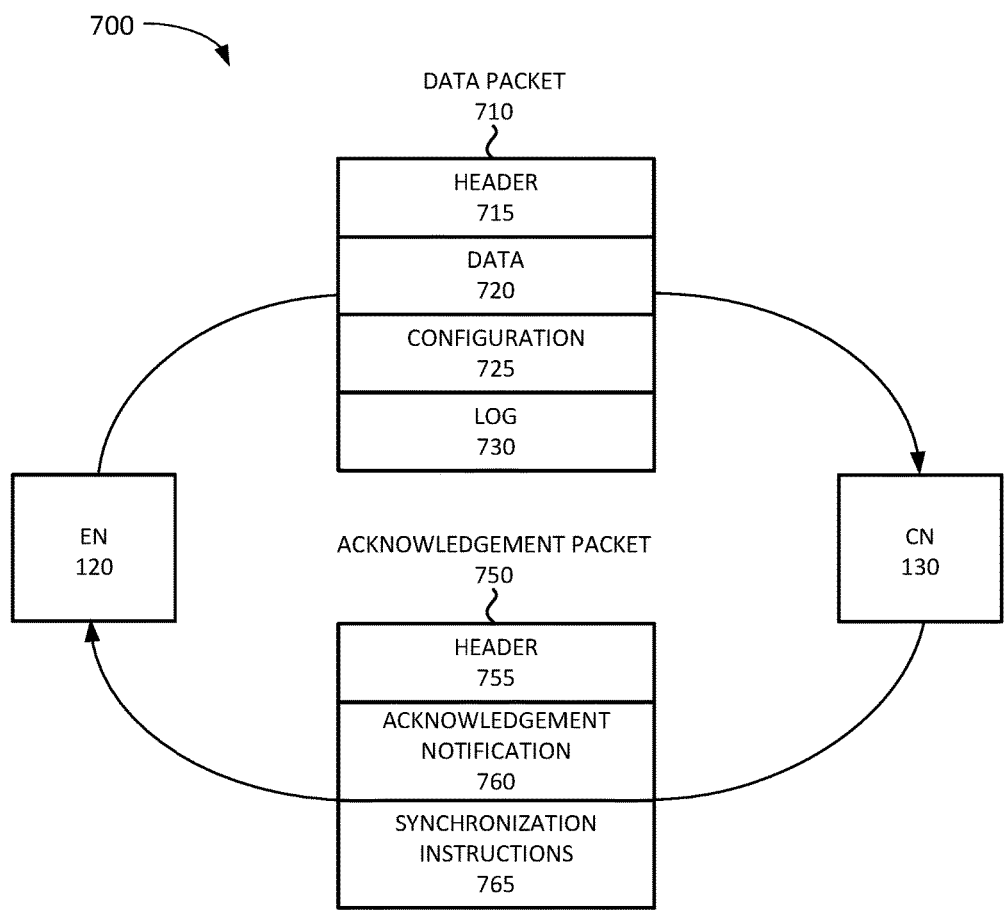
FIG. 7 is a diagram illustrating exemplary components of packets exchanged in an Internet of Things network according to an implementation described herein.

FIG. 7 is a diagram 700 illustrating exemplary components of a packet exchange 700 exchanged in wireless IoT network 110 according to an implementation described herein. As shown in FIG. 7, packet exchange 700 may include EN device 120 sending a data packet 710 to CN device 130 and CN device 130 sending an acknowledgement packet back to EN device 120 in response to receiving data packet 710.

Data packet 710 may include a header field 715, a data field 720, a configuration field 725, and a log field 730. Header field 715 may include information identifying EN device 120 as the source device, information identifying CN device 130 as the destination device, and a timestamp (e.g., a Unix time timestamp). Data field 720 may include a data payload, such as, for example, the status of one or more sensors associated with EN device 120, sensor data from the one or more sensors, and/or a battery level for EN device 120. Configuration field 725 may include information identifying a current configuration of EN device 120. Log field 730 may include information identifying attempts by EN device 120 to send data packet 710 to CN device 130, such as the number of failed attempts to send data packet 710 and/or any errors detected by EN device 120 in connection with sending data packet 710.

Acknowledgement packet 750 may include a header field 755, an acknowledgement notification field 760, and a synchronization instructions field 765. Header field 755 may include information identifying CN device 130 as the source device of acknowledgment packet 750, information identifying EN device 120 as the destination device, and a timestamp (e.g., a Unix time timestamp). Acknowledgement notification field 760 may include an acknowledgment notification that data packet 710 was successfully received by CN device 130.

Synchronization instructions field 765 may include synchronization information for EN device 120. For example, synchronization instructions field 765 may include an instruction to adjust a clock to a time, included with synchronization instructions 765, corresponding to the time of the clock of the active CN device 130. Furthermore, the synchronization instructions may include instructions to send data during particular data time intervals selected by the active CN device 130. In some implementations, the synchronization instructions may further include instructions to enter a sleep mode during particular time periods, such as time periods when EN device 120 is expected not to be collecting data from sensors.

Although FIG. 7 shows exemplary components of data packet 710 and acknowledgement packet 750, in other implementations, data packet 710 and/or acknowledgement packet 750 may include fewer components, different components, additional components, or differently arranged components than depicted in FIG. 7. Furthermore, in other implementations, CN device 130 may send synchronization instructions, including a synchronization clock value, to EN device 120 using another method, such as a packet or another type of data unit that is not sent in response to receiving a data packet.

Figure 8:
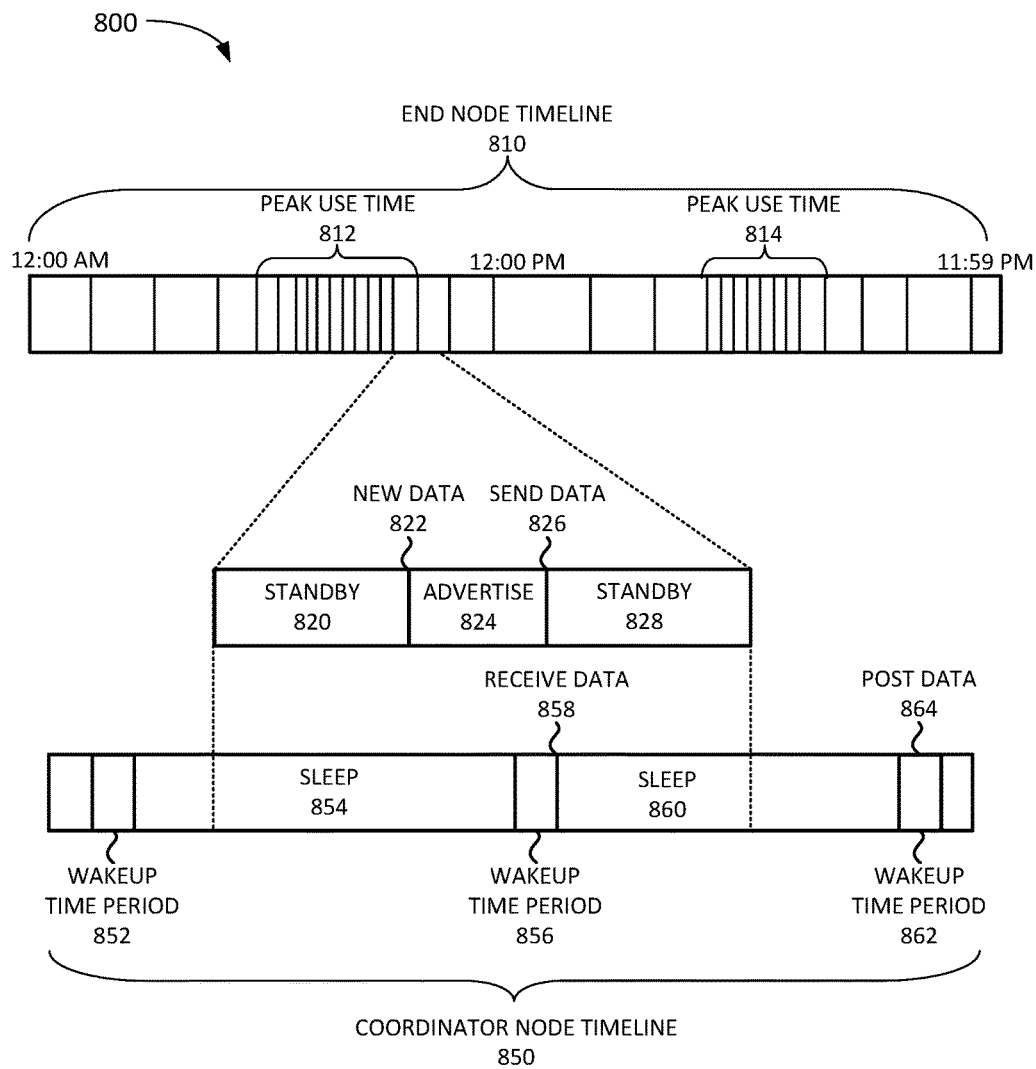
FIG. 8 is a diagram of exemplary timelines associated with an end node device and a coordinator node device according to an implementation described herein.

FIG. 8 is a diagram 800 of exemplary timelines associated with an end node device and a coordinator node device according to an implementation described herein. As shown in FIG. 8, diagram 800 includes an end node timeline 810 for EN device 120 that includes a vehicle occupancy sensor in a parking garage. Each line on time line 810 represents the occupancy sensor detecting a change in the occupancy of a parking space (e.g., a car parking in the space or a car leaving the space) and EN device 120 sending data to the active CN device 130 to report the change in the occupancy. The timeline may include a first peak use time 812 during a morning rush hour period and a second peak use time 814 during an afternoon rush hour period.

The frequency at which data is reported during particular time periods (e.g., each hour of the day) may be used to determine how often to schedule wakeup time periods during the particular time periods. For example, the active CN device 130 may be scheduled to wake up more frequently during peak use time 812 and/or peak use time 814, and less frequently at other times during the day.

FIG. 8 further illustrates an expanded view of a portion of end node timeline 812 that includes a first standby period 820, a new data event 822, an advertise period 824, a send data event 826, and a second standby period 828. EN device 120 may be in a standby mode with reduced power requirements until a sensor included in EN device 120 detects new data (e.g., a change in the occupancy state of a parking space). EN device 120 may exit the standby mode and may begin advertising the new data to the active CN device 130. In some implementations, advertising of new data may include sending a smaller data packet, advertising the availability of new data, than the actual sending of the data.

FIG. 8 further illustrates a coordinator node timeline 850, aligned with the expanded view of the portion of end node timeline 810, for the active CN device 130. Coordinator node timeline 850 may include a first scheduled wakeup time period 852, a first sleep period 854, a second wakeup time period 856, a second sleep period 860, and a third wakeup time period 862. During second wakeup time period 856, the active CN device 130 may detect the advertised data from EN node 120 and may receive the data (send data event 826 and receive data event 858). In response, EN device 120 may stop advertising the new data and enter standby mode (second standby period 828). After second wakeup time period 856 ends, the active CN device 130 may enter sleep mode (second sleep period 860).

When the active CN device 130 wakes up and enters third wakeup time period 862, the active CN device 130 may detect that the active CN device 130 is scheduled to post data to IoT management system 155 during third wakeup time period 862. In response, the active CN device 130 may post or transmit the received data to IoT management system 155 (post data event 864).

Figure 9:
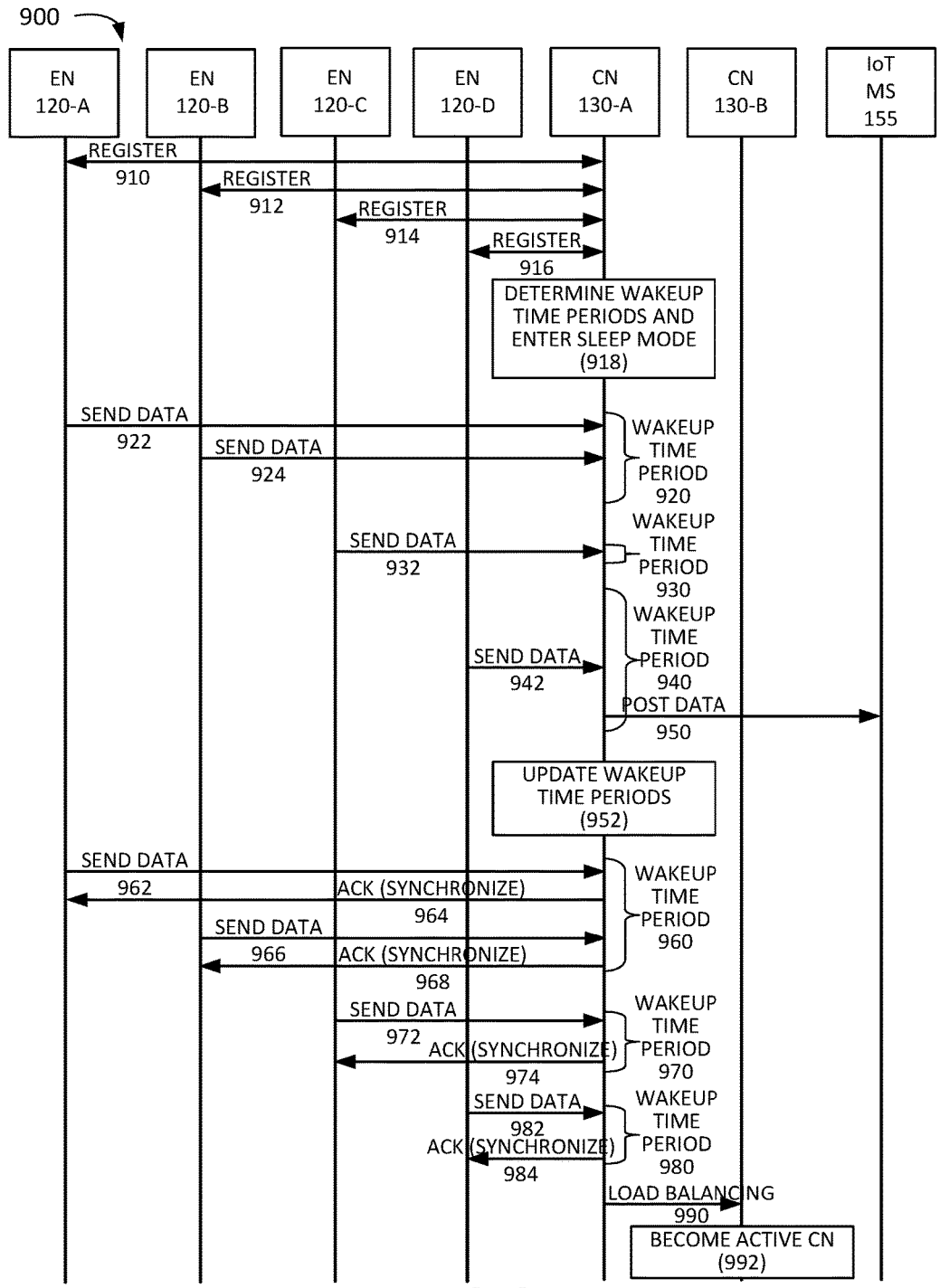
FIG. 9 is an exemplary signal flow of synchronizing a wireless Internet of Things network according to an implementation described herein.

FIG. 9 is an exemplary signal flow 900 of synchronizing a wireless IoT network according to an implementation described herein. Signal flow 900 may be performed by wireless IoT network 110 implemented in a parking garage and/or parking lot in which low-cost, low-power magnetic sensors are connected to a wireless MCU via an Inter-Integrated Circuit (I²C) interface. The magnetic sensors measure the occupancy of the parking garage and/or parking lot and report the occupancy data to IoT management system 155 at particular intervals via Cat-M1.

As shown in FIG. 9, signal flow 900 may be performed in a wireless IoT network 110 that includes EN device 120-A, EN device 120-B, EN device 120-C, EN device 120-D, CN device 130-A, and CN device 130-B. Signal flow 900 may include CN device 130-A starting as the active CN device 130 and registering EN devices 120-A, 120-B, 120-C, and 120-D (signals 910, 912, 914, and 916, respectively). During registration, CN device 130-A may obtain information from each EN device 120, such as a clock error rate associated with each EN device 120, and/or any available information relating to time periods during which each EN device 120 is expected to send data and/or a frequency with which each EN device 120 is expected to send data during particular time periods. CN device 130-A may then determine wakeup time periods and enter a sleep mode based on the obtained information (block 918).

CN device 130-A may receive data sent by EN device 120-A and EN device 120-B during a first wakeup time period 920 (signals 922 and 924). CN device 130-A may then receive data sent by EN device 120-C during a second wakeup time period 930 (signal 932). CN device 130-A may then receive data sent by EN device 120-D during a third wakeup time period 940 (signal 942). Furthermore, during third wakeup time period 940, CN device 130-A may post the received data to IoT management system (MS) 155 (signal 950). Moreover, CN device 130-A may update the wakeup time periods, if necessary, based on when the data was received from EN devices 120-A to 120-D (block 952).

At a later time, CN device 130-A may enter a wakeup time period 960 and may receive data from EN device 120-A (signal 962). CN device 130-A may determine that synchronization information is to be sent during wakeup time period 960 and may, in response, send an acknowledgment message back to EN device 120-A that the data was successfully received (signal 964). The acknowledgement message may include clock synchronization data, such as an instruction to synchronize the clock of EN device 120-A with the clock of CN device 130-A. CN device 130-A may also receive data from EN device 120-B during wakeup time period 960 (signal 966) and CN device 130-A may, in response, send an acknowledgment message back to EN device 120-B that the data was successfully received (signal 968). The acknowledgement message may include clock synchronization data, such as an instruction to synchronize the clock of EN device 120-B with the clock of CN device 130-A.

At a later time, CN device 130-A may enter a wakeup time period 970 and may receive data from EN device 120-C (signal 972). CN device 130-A may determine that synchronization information is to be sent during wakeup time period 970 and may, in response, send an acknowledgment message back to EN device 120-C that the data was successfully received (signal 974). The acknowledgement message may include clock synchronization data, such as an instruction to synchronize the clock of EN device 120-C with the clock of CN device 130-A.

At a later time, CN device 130-A may enter a wakeup time period 980 and may receive data from EN device 120-D (signal 982). CN device 130-D may determine that synchronization information is to be sent during wakeup time period 980 and may, in response, send an acknowledgment message back to EN device 120-D that the data was successfully received (signal 984). The acknowledgement message may include clock synchronization data, such as an instruction to synchronize the clock of EN device 120-D with the clock of CN device 130-A. Furthermore, CN device 130-A may determine that load balancing is to be performed at the end of wakeup time period 980 and may, in response, send an instruction to CN device 130-B to become the active CN device 130 (signal 990). In response, CN device 130-B may elect to become the active CN device 130 in wireless IoT network 110 (block 992). CN device 130-B may then perform processing similar to CN device 130-A described above with respect to signal flow 900.

In the preceding specification, various preferred embodiments have been described with reference to the accompanying drawings. It will, however, be evident that various modifications and changes may be made thereto, and additional embodiments may be implemented, without departing from the broader scope of the invention as set forth in the claims that follow. The specification and drawings are accordingly to be regarded in an illustrative rather than restrictive sense.

For example, while series of blocks have been described with respect to FIG. 6, and series of signal flows have been described with respect to FIG. 9, the order of the blocks and/or signal flows may be modified in other implementations. Further, non-dependent blocks may be performed in parallel.

It will be apparent that systems and/or methods, as described above, may be implemented in many different forms of software, firmware, and hardware in the implementations illustrated in the figures. The actual software code or specialized control hardware used to implement these systems and methods is not limiting of the embodiments. Thus, the operation and behavior of the systems and methods were described without reference to the specific software code—it being understood that software and control hardware can be designed to implement the systems and methods based on the description herein.

Further, certain portions, described above, may be implemented as a component that performs one or more functions. A component, as used herein, may include hardware, such as a processor, an ASIC, or a FPGA, or a combination of hardware and software (e.g., a processor executing software).

It should be emphasized that the terms "comprises"/ "comprising" when used in this specification are taken to specify the presence of stated features, integers, steps or components but does not preclude the presence or addition of one or more other features, integers, steps, components or groups thereof.

The term "logic," as used herein, may refer to a combination of one or more processors configured to execute instructions stored in one or more memory devices, may refer to hardwired circuitry, and/or may refer to a combination thereof. Furthermore, a logic may be included in a single device or may be distributed across multiple, and possibly remote, devices.

For the purposes of describing and defining the present invention, it is additionally noted that the term "substantially" is utilized herein to represent the inherent degree of uncertainty that may be attributed to any quantitative comparison, value, measurement, or other representation. The term "substantially" is also utilized herein to represent the degree by which a quantitative representation may vary from a stated reference without resulting in a change in the basic function of the subject matter at issue.

To the extent the aforementioned embodiments collect, store or employ personal information provided by individuals, it should be understood that such information shall be used in accordance with all applicable laws concerning protection of personal information. Additionally, the collection, storage and use of such information may be subject to consent of the individual to such activity, for example, through well known "opt-in" or "opt-out" processes as may be appropriate for the situation and type of information. Storage and use of personal information may be in an appropriately secure manner reflective of the type of information, for example, through various encryption and anonymization techniques for particularly sensitive information.

No element, act, or instruction used in the present application should be construed as critical or essential to the embodiments unless explicitly described as such. Also, as used herein, the article "a" is intended to include one or more items. Further, the phrase "based on" is intended to mean "based, at least in part, on" unless explicitly stated otherwise.

What is claimed is:

1. A method comprising:
   identifying, by an Internet of Things (IoT) device, a plurality of IoT devices associated with a wireless IoT network, wherein the IoT device is configured as a coordinator for the wireless IoT network;
   determining, by the IoT device, a clock error rate associated with the wireless IoT network;
   determining, by the IoT device, a last synchronization time;
   determining, by the IoT device, a data time period during which one or more of the plurality of IoT devices are expected to send data to the IoT device;
   setting, by the IoT device, a wakeup time period for the IoT device based on the determined clock error rate, the determined last synchronization time, and the determined data time period;
   entering, by the IoT device, a sleep mode;
   exiting, by the IoT device, the sleep mode when the wakeup time period begins; and performing, by the IoT device, a clock synchronization between the IoT device and at least one of the plurality of IoT devices during the wakeup time period.

2. The method of claim 1, wherein performing the clock synchronization between the IoT device and the at least one of the plurality of IoT devices includes:
receiving data from the at least one of the plurality of IoT devices during the wakeup time period; and
sending an acknowledgement packet to the at least one of the plurality of IoT devices, wherein the acknowledgement packet includes synchronization data associated with a clock of the IoT device.

3. The method of claim 2, further comprising:
sending the received data to a server device associated with the plurality of IoT devices via a wireless cellular network connection.

4. The method of claim 2, further comprising:
determining a new data time period based on a time period associated with the received data; and
setting a new wakeup time period for the plurality of IoT devices based on the determined clock error rate and the determined new data time period.

5. The method of claim 1, wherein the IoT device is configured to communicate with the plurality of IoT devices using a short-range wireless connection, wherein the short-range wireless connection includes a WiFi connection, a Bluetooth connection, or a ZigBee connection.

6. The method of claim 1, further comprising:
instructing the plurality of IoT devices to wait to send data to the IoT device until the IoT device exits the sleep mode.

7. The method of claim 1, wherein determining the data time period during which one or more of the plurality of IoT devices are expected to send data to the IoT device includes:
selecting the data time period based on the determined clock error rate; and
instructing the at least one of the plurality of IoT devices to send the data to the IoT device during the selected data time period.

8. The method of claim 1, wherein determining the data time period during which one or more of the plurality of IoT devices are expected to send data to the IoT device includes:
determining a time period during which the at least one of the plurality of IoT devices is expected to send the data based on at least one of:
a time of day during which the at least one of the plurality of IoT devices has previously sent data to the IoT device;
a calendar event associated with the at least one of the plurality of IoT devices; or
a weather event associated with the at least one of the plurality of IoT devices.

9. The method of claim 1, wherein determining the clock error rate associated with the wireless IoT network includes:
determining an error rate of a clock crystal associated with the IoT device;
determining error rates of clock crystals associated with particular ones of the plurality of IoT devices; and
selecting a clock error rate based on a highest one of the error rate of the clock crystal associated with the IoT device and the error rates of clock crystals associated with particular ones of the plurality of IoT devices.

10. The method of claim 1, further comprising:
performing load balancing with another IoT device configured as another coordinator for the wireless IoT network, wherein performing the load balancing includes:
instructing particular ones of the plurality of IoT devices to send data to the other IoT device during a subsequent synchronization time period; and
instructing the other IoT device to exit the sleep mode and perform the clock synchronization during the subsequent synchronization time period.

11. A device comprising:
a memory configured to store instructions; and
a processor configured to execute the instructions to:
identify a plurality of Internet of Things (IoT) devices associated with a wireless IoT network, wherein the device is configured as a coordinator for the wireless IoT network;
determine a clock error rate associated with the wireless IoT network;
determine a last synchronization time;
determine a data time period during which one or more of the plurality of IoT devices are expected to send data to the device;
set a wakeup time period for the device based on the determined clock error rate, the determined last synchronization time, and the determined data time period;
enter a sleep mode;
exit the sleep mode when the wakeup time period begins; and
perform a clock synchronization between the device and at least one of the plurality of IoT devices during the wakeup time period.

12. The device of claim 11, wherein, when performing the clock synchronization between the device and the at least one of the plurality of IoT devices, the processor is further configured to:
receive data from the at least one of the plurality of IoT devices during the wakeup time period; and
send an acknowledgement packet to the at least one of the plurality of IoT devices, wherein the acknowledgement packet includes synchronization data associated with a clock of the device.

13. The device of claim 12, wherein the processor is further configured to:
send the received data to a server device associated with the plurality of IoT devices via a wireless cellular network connection.

14. The device of claim 12, wherein the processor is further configured to:
determine a new data time period based on a time period associated with the received data; and
set a new wakeup time period for the plurality of IoT devices based on the determined clock error rate and the determined new data time period.

15. The device of claim 11, wherein the processor is further configured to:
instruct the plurality of IoT devices to wait to send data to the device until the device exits the sleep mode.

16. The device of claim 11, wherein, when determining the data time period during which one or more of the plurality of IoT devices are expected to send data to the device, the processor is further configured to:
select the data time period based on the determined clock error rate; and
instruct the at least one of the plurality of IoT devices to send the data to the device during the selected data time period.

17. The device of claim 11, wherein, when determining the data time period during which one or more of the plurality of IoT devices are expected to send data to the device, the processor is further configured to:
    determine a time period during which the at least one of the plurality of IoT devices is expected to send the data based on at least one of:
        a time of day during which the at least one of the plurality of IoT devices has previously sent data to the device;
        a calendar event associated with the at least one of the plurality of IoT devices; or
        a weather event associated with the at least one of the plurality of IoT devices.

18. The device of claim 11, wherein, when determining the clock error rate associated with the wireless IoT network, the processor is further configured to:
    determine an error rate of a clock crystal associated with the device;
    determine error rates of clock crystals associated with particular ones of the plurality of IoT devices; and
    select a clock error rate based on a highest one of the error rate of the clock crystal associated with the device and the error rates of clock crystals associated with particular ones of the plurality of IoT devices.

19. The device of claim 11, wherein the processor is further configured to:
    perform load balancing with another device configured as another coordinator for the wireless IoT network, wherein, when performing the load balancing, the processor is further configured to:
        instruct particular ones of the plurality of IoT devices to send data to the other device during a subsequent synchronization time period; and
        instruct the other device to exit the sleep mode and perform the clock synchronization during the subsequent synchronization time period.

20. A non-transitory computer-readable memory device storing instructions executable by a processor associated with an Internet of Things (IoT) device, the non-transitory computer-readable memory device comprising:
    one or more instructions to identify a plurality of IoT devices associated with a wireless IoT network, wherein the IoT device is configured as a coordinator for the wireless IoT network;
    one or more instructions to determine a clock error rate associated with the wireless IoT network;
    one or more instructions to determine a last synchronization time;
    one or more instructions to determine a data time period during which one or more of the plurality of IoT devices are expected to send data to the device;
    one or more instructions to set a wakeup time period for the device based on the determined clock error rate, the determined last synchronization time, and the determined data time period;
    one or more instructions to enter a sleep mode;
    one or more instructions to exit the sleep mode when the wakeup time period begins; and
    one or more instructions to perform a clock synchronization between the device and at least one of the plurality of IoT devices during the wakeup time period.

\* \* \* \* \*